(12) United States Patent
Shalev et al.

(10) Patent No.: US 12,256,862 B2
(45) Date of Patent: Mar. 25, 2025

(54) APPARATUS FOR FROTHING A QUANTITY OF MILK

(71) Applicants: COFFEE INNOVATIONS PTY LTD, Caulfield North (AU); LA MARZOCCO S.R.L., Scarperia (IT)

(72) Inventors: Ziv Shalev, Prahran (AU); Enrico Wurm, Scarperia (IT)

(73) Assignees: COFFEE INNOVATIONS PTY LTD, Caulfield North (AU); LA MARZOCCO S.R.L., Scarperia (IT)

( * ) Notice: Subject to any disclaimer, the term of this patent is extended or adjusted under 35 U.S.C. 154(b) by 324 days.

(21) Appl. No.: 16/612,820

(22) PCT Filed: May 17, 2018

(86) PCT No.: PCT/EP2018/062883
§ 371 (c)(1),
(2) Date: Nov. 12, 2019

(87) PCT Pub. No.: WO2018/211033
PCT Pub. Date: Nov. 22, 2018

(65) Prior Publication Data
US 2020/0138233 A1 May 7, 2020

(30) Foreign Application Priority Data

May 19, 2017 (IT) .................. 102017000054448

(51) Int. Cl.
*A47J 31/44* (2006.01)
(52) U.S. Cl.
CPC ....... *A47J 31/4489* (2013.01); *A47J 31/4425* (2013.01)

(58) Field of Classification Search
CPC ..... A47J 31/4489; A47J 31/4425; A47J 31/44
See application file for complete search history.

(56) References Cited

U.S. PATENT DOCUMENTS

| 5,598,764 A | 2/1997 | Bambi |
| 6,095,032 A | 8/2000 | Barnett |
(Continued)

FOREIGN PATENT DOCUMENTS

| EP | 1475016 A1 * | 11/2004 | ............. A47G 19/12 |
| EP | 1532902 A1 * | 5/2005 | ............. A47J 27/62 |
(Continued)

OTHER PUBLICATIONS

International Search Report for PCT/EP2018/062883, mailed Jul. 5, 2018, 4 pages.
(Continued)

*Primary Examiner* — Helena Kosanovic
*Assistant Examiner* — Thao Uyen Tran-Le
(74) *Attorney, Agent, or Firm* — NIXON & VANDERHYE P.C.

(57) ABSTRACT

An apparatus for frothing a quantity of milk for preparing a beverage comprises: a platform (1) for supporting a jug (50) containing the quantity of milk to be frothed and a steam wand (10) configured for emitting steam, wherein either the platform (1) is tiltable around a horizontal axis (X, Y) or the steam wand (10) is tiltable around a horizontal axis and wherein the steam wand (10) and the platform (1) are reciprocally movable by a translational movement in the vertical direction one with respect to the other. A translational vertical motion of the steam wand is preferably provided with respect to the jug and/or of the jug with respect to the steam wand.

15 Claims, 9 Drawing Sheets

(56) References Cited

U.S. PATENT DOCUMENTS

| | | |
|---|---|---|
| 8,505,441 B2 | 8/2013 | Bambi |
| 9,320,386 B2 * | 4/2016 | Hulett .................. A47J 31/4475 |
| 9,474,417 B1 * | 10/2016 | Pryor, Jr. .............. A47J 43/044 |
| D780,500 S | 3/2017 | Bambi |
| 10,687,660 B2 | 6/2020 | Gatti |
| 10,881,242 B2 | 1/2021 | Dionisio |
| 11,122,927 B2 | 9/2021 | Bianchi |
| 11,503,947 B2 | 11/2022 | Della Pietra |
| 11,517,142 B2 | 12/2022 | Gatti |
| 11,517,143 B2 | 12/2022 | Dionisio |
| 11,825,990 B2 | 11/2023 | Dionisio |
| 2004/0009281 A1 | 1/2004 | Green |
| 2011/0094392 A1 | 4/2011 | Bianchi |
| 2012/0073449 A1 * | 3/2012 | Volonte ............... A47J 31/4489 |
| | | 99/323.1 |
| 2012/0266754 A1 | 10/2012 | Bambi |
| 2013/0019903 A1 * | 1/2013 | Rizzuto ............... A47J 31/4485 |
| | | 99/280 |
| 2013/0064941 A1 | 3/2013 | Taitler |
| 2014/0134305 A1 * | 5/2014 | Wolfe .................. A47J 36/165 |
| | | 99/348 |
| 2014/0137746 A1 | 5/2014 | Moran |
| 2014/0251494 A1 * | 9/2014 | Stieger .................. G07F 13/10 |
| | | 220/737 |
| 2014/0264972 A1 * | 9/2014 | Studor ................ B01F 35/1452 |
| | | 261/121.1 |
| 2015/0064323 A1 * | 3/2015 | Prefontaine ......... A47J 31/5251 |
| | | 426/433 |
| 2015/0065323 A1 | 3/2015 | Prefontaine |
| 2015/0135966 A1 | 5/2015 | Hulett et al. |
| 2015/0230657 A1 * | 8/2015 | Marco .................... A47J 47/04 |
| | | 220/573.1 |
| 2016/0058238 A1 * | 3/2016 | Purton .................. A23C 9/1524 |
| | | 261/130 |
| 2016/0150911 A1 * | 6/2016 | Upston ............... A47J 31/3685 |
| | | 99/300 |
| 2016/0192809 A1 | 7/2016 | Bakke |
| 2016/0368753 A1 * | 12/2016 | Bethuy ............... A47J 31/4403 |
| 2017/0079468 A1 | 3/2017 | Apone et al. |
| 2018/0055275 A1 | 3/2018 | Bianchi |
| 2018/0192811 A1 | 7/2018 | Dionisio |
| 2018/0303284 A1 | 10/2018 | Gatti |
| 2018/0360257 A1 | 12/2018 | Dionisio |
| 2019/0075964 A1 | 3/2019 | Della Pietra |
| 2020/0093323 A1 | 3/2020 | Dionisio |
| 2020/0138233 A1 | 5/2020 | Shalev |
| 2020/0237137 A1 | 7/2020 | Bakke |
| 2021/0204748 A1 | 7/2021 | Della Pietra |
| 2021/0315415 A1 | 10/2021 | Bianchi |
| 2022/0007875 A1 | 1/2022 | Della Pietra |
| 2022/0061586 A1 | 3/2022 | Guglielmino |
| 2022/0095839 A1 | 3/2022 | Dionisio |
| 2022/0117442 A1 | 4/2022 | Dionisio |
| 2023/0284819 A1 | 9/2023 | Dionisio |
| 2023/0284823 A1 | 9/2023 | Wurm |
| 2023/0284831 A1 | 9/2023 | Dionisio |
| 2023/0284834 A1 | 9/2023 | Dionisio |
| 2024/0032726 A1 | 2/2024 | Moran |

FOREIGN PATENT DOCUMENTS

| | | | |
|---|---|---|---|
| EP | 1647951 A1 * | 4/2006 | .......... A47J 31/4482 |
| EP | 2 389 848 | 11/2011 | |
| EP | 2 433 527 | 3/2012 | |
| JP | 2012071132 A * | 4/2012 | .......... A47J 31/4489 |
| JP | 2013-165814 A | 8/2013 | |
| JP | 2017-500091 A | 1/2017 | |
| WO | WO 2016/079680 | 5/2016 | |
| WO | WO-2016079680 A1 * | 5/2016 | .............. A01J 11/04 |
| WO | WO-2016151108 A1 * | 9/2016 | .............. A01J 11/04 |

OTHER PUBLICATIONS

Written Opinion of the ISA for PCT/EP2018/062883, mailed Jul. 5, 2018, 7 pages.

* cited by examiner

APPARATUS FOR FROTHING A QUANTITY OF MILK

This application is the U.S. national phase of International Application No. PCT/EP2018/062883 filed 17 May 2018, which designated the U.S. and claims priority to IT patent application No. 102017000054448 filed 19 May 2017, the entire contents of each of which are hereby incorporated by reference.

BACKGROUND

The present invention relates to the field of machines for preparing beverages. More particularly, the present invention relates to the field of machines making hot beverages such as espresso coffee machines or the like used in coffee shops, restaurants or the like or in domestic environment. Still more in particular the present invention relates to an apparatus for heating and/or frothing a quantity of milk or any other liquid food for preparing hot beverages such as cappuccinos or any variant of espresso coffees including an amount of hot frothed milk. Finally, the present invention relates to a method of frothing a quantity of milk for preparing any of the above mentioned beverages.

STATE OF THE ART

As is known, an espresso coffee machine brews coffee by forcing pressurized water near boiling point through a puck of ground coffee and a filter in order to produce a thick, concentrated coffee beverage called espresso or espresso coffee. Several espresso coffee machines are equipped with means for producing steam for heating and/or frothing an amount of water, milk or the like. Such steam producing means typically comprise a steam reservoir such as a steam boiler, a steam circuit, a steam valve and a steam wand terminating with an opening emitting the steam.

Typically, an espresso coffee machine operator (also referred to as "barista") introduces the steam wand into a jug or a similar container containing an amount of liquid to be heated and frothed. Then, he/she opens the steam circuit so that steam exits from the opening at the end of the wand. While the steam is exiting, the barista properly moves, and/or translate and/or rotates the jug in order to obtain a milk (or the like) at the proper temperature and with the proper frothing and texture.

The resulted hot frothed milk is typically used for preparing a cappuccino, a "caffè macchiato" (a single shot espresso coffee with a rather small amount of hot frothed milk, served into a coffee cup) or any of a known plurality of variations to espresso coffee. Hot frothed milk is also used for preparing other beverages, not necessarily based on coffee, such as hot chocolate.

WO 2016/079680 A1 discloses a device, comprising a platform for placing a vessel containing the liquid, a pipe with an open end configured for supplying steam to the vessel, a driving device configured to actuate a relative movement between the end of the pipe and the platform, means for determining a liquid level of the liquid in the vessel, and a control unit. The control unit is configured to actuate the driving device so that a relative initial position between the end of the pipe and the platform is assumed on the basis of the liquid level. The means for determining the liquid level comprise a weighing device. The control unit is then configured to determine the liquid level from the weight.

EP 2 433 527 A1 discloses an automatic milk frothing wand.

US 2014/264972 A1 discloses a frothing assembly and method of operating the same.

US 2004/0009281 discloses a system and method for producing foamed and steamed milk for hot beverages.

EP 2 389 848 A1 discloses a device for heating and foaming milk and related method.

US 20013/064941 A1 discloses a method for preparing micro-foam whipped milk for cappuccino or a method for whipping other liquids containing proteins, using an apparatus.

SUMMARY OF THE INVENTION

For the present description and claims, the term "milk" will include any liquid food comprising milk of animal origin, vegetal milk (namely milk extracted from plants) and milk obtained from chemical processes. Animal origin milk comprises cow milk, goat milk and sheep milk. Vegetal milk comprises the so called soy milk, almond milk, coconut milk and rise milk.

For the present description and claims, the term "espresso coffee machine", "coffee machine" or "machine" will refer to a machine for making hot beverages such as espresso coffee, cappuccino or the like. While, typically, such machines use ground coffee for producing the beverages, they can use also powder of other cereals, such as barley.

For the present description and claims, the term "jug" will include a pitcher and any other container or vessel adapted to contain milk to be heated and/or frothed.

Unless otherwise indicated, the expression "frothing milk" will include also heating the milk and providing the milk with a certain appropriate texture by using steam and/or heated air so that the milk increases the volume and generates a microbubble structure.

For the present description and claims, the verb "to tilt" is intended to mean a repetitive movement clockwise-anticlockwise about a central position. One example comprises:
i. a clockwise (or counter-clock) movement from a reference point to a first maximum rotation point at +δ degrees from the reference point;
ii. a counter-clock (or clockwise) movement from the first maximum rotation point to a second maximum rotation point at −δ degrees from the reference point;
iii. a clockwise (or counter-clock) movement from the second maximum rotation point to a first maximum rotation point at +δ degrees from the reference point.

Typically, a tilting movement comprises a number of oscillations according to ii. and iii. and it is identified by an angle of rotation about the reference point. For instance, the term "±15°" indicates an oscillating rotational movement of 15° about the reference point. This means that, at regime, there is provided a rotation clockwise-counterclockwise having an angular extension of 30°.

Preferably, the clockwise and counterclockwise rotations are carried out at the same angular velocity.

The rotation movement can be continuous, without any pause before starting the rotation in an opposite direction, or, alternatively, a pause can be provided before starting the rotation in an opposite direction.

In the present description and claims, unless otherwise specified, all the numbers and values should be intended as preceded by the term "about".

In the present description and claims, the expression "horizontal" will include perfectly horizontal and substantially horizontal, namely inclined by an angle lower than 10° and, preferably, lower than 5° with respect to horizontal direction. Similarly, the expression "vertical" will include perfectly vertical and substantially vertical, namely inclined by an angle lower than 10° and, preferably, lower than 5° with respect to vertical direction.

Frothing milk for espresso based drinks is an art form which demand long hours of training and understanding of the process. The hand motion of a highly experienced coffee machine operator will determine the consistency and texture of frothed milk.

The Applicant has realized that the device of WO 2016/079680 helps a barista to froth a quantity of milk but it does not result in a milk frothed as made by an experienced barista.

The Applicant has tackled the problem of providing an apparatus for frothing milk as made by an experienced barista.

In particular, the Applicant has tackled the problem of providing an apparatus imitating the movements of the highly experienced coffee machine operator hands and which reproduces the highest quality of frothed milk as per the coffee industry standards in an automatic manner.

The Applicant has realized that better results are obtained when the jug containing the quantity of milk is tilted during supply of steam to the milk.

The apparatus of the invention can be used in coffee shops and restaurants to increase the productivity of the coffee machine operator and provide high consistency of frothed milk with regarding to texture and temperature of the milk. However, the apparatus according to the present invention can be used in a domestic environment (i.e. house hold) to provide a professional coffee experience at home.

The apparatus of the invention automatically produces the highest graded frothed milk by imitating the motion of a skilled coffee machine operator.

The apparatus of the invention combines a tilting motion of the jug (and/or of the steam wand) and a translational vertical motion of the steam wand with respect to the jug (and/or of the jug with respect to the steam wand). The Applicant has realized that by tilting the jug in a pivotal motion, the gravitational force forces the milk in a rotational manner. The milk creates turbulences smoothing out the air bubbles in the milk introduced by the steam. This results in a micro bubbles consistency.

According to preferred embodiments, the apparatus comprises temperature and/or level sensors.

The combination of reciprocal vertical motion of the wand with respect to the jug, pivotal motion of the jug and/or of the steam wand, temperature sensing and level sensing of the milk mimics the ability of a highly skilled coffee machine operator in an automatic manner which produces high quality, high consistency, smooth and shiny frothed milk in the highest grade and form.

The machine can assist coffee machine operators in busy café environment and unskilled coffee operators to produce the perfect cup of coffee and/or milk base drink consistently.

Also, the apparatus is designed to help coffee lovers to produce the perfect cup of coffee/milk based drink at home without extensive training or pre-existing knowledge.

According to an aspect, the present invention provides an apparatus of frothing a quantity of milk, the apparatus comprising: a platform for supporting a jug containing the quantity of milk to be frothed and a steam wand configured for emitting steam and/or heated air, wherein either said platform is tiltable around a horizontal axis or the steam wand is tiltable around a horizontal axis and wherein said steam wand and said platform are reciprocally movable.

Preferably, they are movable by a translational movement in the vertical direction one with respect to the other. More precisely, there is provided a translational vertical motion of the steam wand with respect to the jug and/or of the jug with respect to the steam wand.

In embodiments, the apparatus according further comprises a horizontal shaft and a motor connected to said shaft, wherein the shaft is also connected to the platform so that tilting of the shaft results into tilting of the platform.

The platform may comprise a centering mechanism which is designed in such a way that a jug of a first diameter or a jug of a second diameter, which is higher than the first diameter, can be accommodated on said platform in a centered way.

The apparatus may comprise a linear actuator with a translation carriage for translating vertically said steam wand connected to said translation carriage.

The apparatus may further comprise at least one of a IR temperature sensor arranged for sensing a temperature of a side wall of the jug and a IR milk temperature sensor arranged for sensing a temperature of the milk in the jug.

The apparatus may further comprise a proximity sensor for measuring milk level in the jug.

The apparatus may further comprise a radio-frequency identification, RFID, reader configured for reading a radio-frequency identification, RFID, tag in order to identify a size of the jug.

The apparatus may further comprise a proximity sensor in order to identify a size of the jug.

The apparatus may further comprise a three-way valve connected to a source of steam.

The apparatus may further comprise a display and means for selecting one of a plurality of parameters.

According to a second aspect, the present invention provides a method of frothing a quantity of milk for preparing a beverage, the method comprising:
  providing a jug with a quantity of milk therein;
  providing a supporting platform and placing the jug on the supporting platform;
  providing a steam wand emitting steam and/or heated air, wherein the steam wand and the supporting platform are reciprocally movable one with respect to the other from a first position wherein an end of the wand is not within said jug to a second position wherein the end of the wand is within the jug at least partially immersed in the quantity of milk; and
  causing emission of steam and/or heated air from the wand end while tilting at least one of the supporting platform and steam wand.

The method may further comprise IR sensing a temperature of a side wall of the jug and/or IR sensing a temperature of the milk in the jug.

The method may further comprise measuring milk level in the jug by a proximity sensor.

The method may further comprise means for identifying a size of the jug.

The method may further comprise discharging any condensate steam formed in steam tubing before starting a frothing cycle.

According to one embodiment, the apparatus can be incorporated in a coffee machine.

According to another embodiment, the apparatus of the present invention can be made as a device which is separated from the coffee machine. Possibly, the steam generation circuit can be at least partially incorporated into the coffee machine.

According to a still another embodiment, at least a portion of the steam generation circuit can be arranged in a remote position with respect to the apparatus. For instance, the apparatus can be arranged on a counter or any other supporting surface and the steam circuit (or at least the steam boiler) can be under the counter in order to save space on the counter. The steam boiler can be arranged into a module which is removable. For instance the module can be translated similarly to a drawer.

BRIEF DESCRIPTION OF DRAWINGS

The present invention will become clearer from the following description, provided by way of a non-limiting example, to be read with reference to the accompanying drawings, in which.

DETAILED DESCRIPTION

A frothing apparatus according to an embodiment of the present invention is shown, in different configurations, in several of the attached figures. It should be remarked that only some parts of the apparatus, including those which are important for understanding the invention, are shown. Finally, the apparatus could take a different shape and it could be provided with a properly shaped housing.

Figure 1:
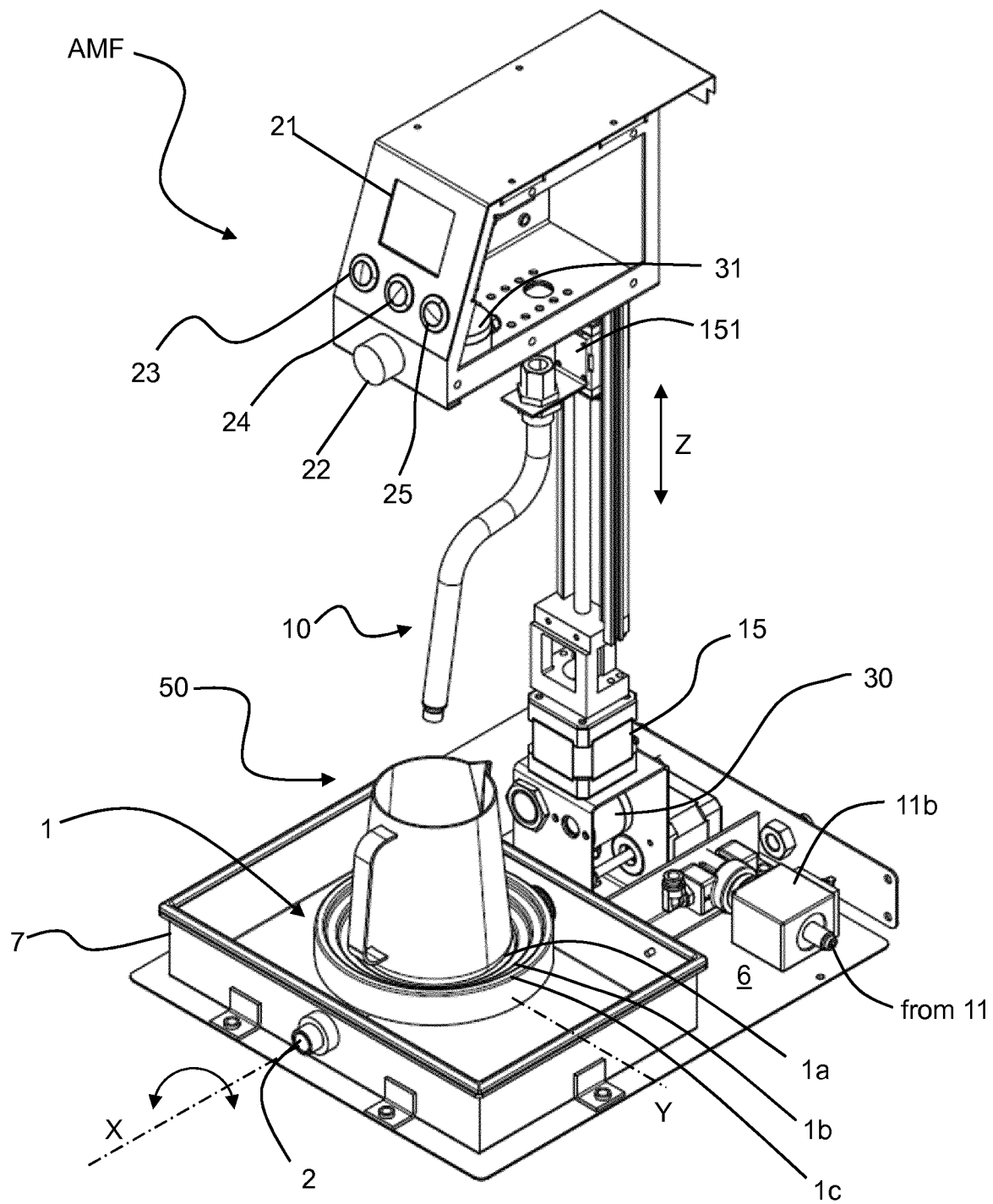
FIG. 1 is an isometric view of the frothing apparatus according to an embodiment of the present invention with the steam wand in its uppermost position and the liquid container support in horizontal position.

FIG. 1 shows an embodiment of the frothing apparatus according to the present invention. The apparatus is globally indicated by reference number AMF.

The frothing apparatus AMF comprises a platform 1 for supporting a jug 50. Preferably, the platform 1 is round or substantially round. The diameter of the platform 1 is adapted to accommodate the bottom of the jug 50.

However, according to preferred embodiments of the present invention, the platform 1 is configured for accommodating a plurality of jugs, each having a different volume and a corresponding different bottom diameter. Preferably, the platform 1 comprises a centering mechanism for arranging the jug in a centered arrangement. According to one embodiment, the centering mechanism comprises three concentric round steps 1a, 1b and 1c. Round step 1a is designed for accommodating a small size jug (for instance a 400 ml jug); round step 1b is designed for accommodating a medium size jug (for instance a 600 ml jug); and round step 1c is designed for accommodating a large size jug (for instance a 1000 ml jug). In the Figures, a small size jug is shown for exemplary purposes. Step 1c projects upwardly more than step 1b. In turn, step 1b projects upwardly more than step 1a.

In addition, or as an alternative, to concentric round steps, the centering mechanism could comprise magnetic devices or a conical platform.

Preferably, platform 1 is thermally insulated. According to one embodiment, platform 1 is lagged with a high friction polymer with the ability to withstand high temperatures of 100° C. or more. An adapted polymer could be Polyoxymethylene (POM), Polyvinyl chloride (PVC), Polyamide-Nylon (PA), Polytetrafluoroethylene (PTFE), Polyether ether ketone (PEEK), fluorocarbon (for instance Viton) FKM, or any combination thereof.

Figure 4:
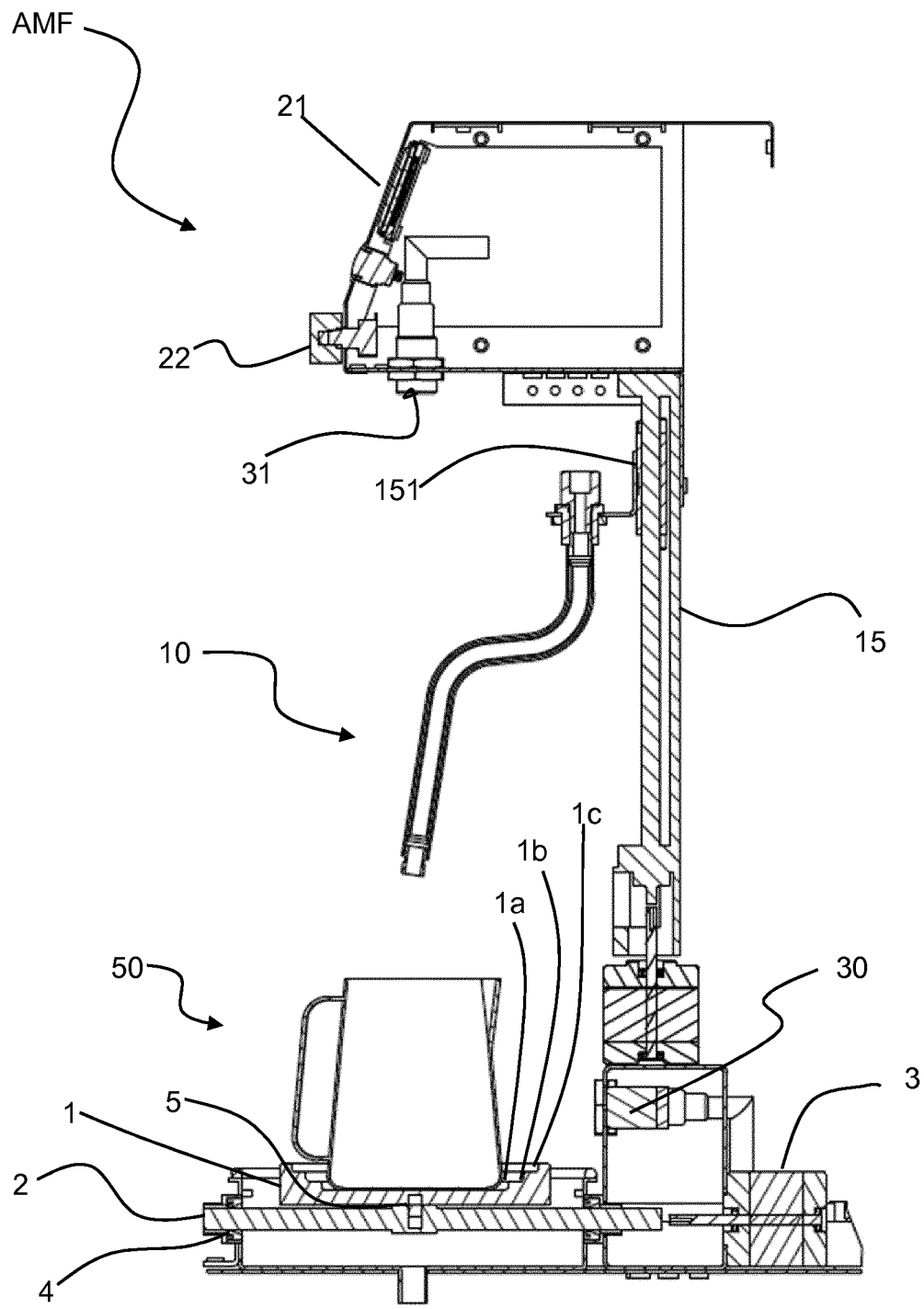
FIG. 4 is a cross section of the frothing apparatus shown in FIG. 1.

The supporting platform 1 is tiltable around a tilting axis X. Preferably, the tilting axis X is substantially horizontal. Tilting axis X can be directed as shown in FIGS. 1 and 4. However, tilting can equally be performed around an axis Y directed at a 90° with respect to or in any other arrangement.

Having reference to FIG. 4, preferably, tilting of the supporting platform 1 is carried out through a shaft 2 passing through the center of the supporting platform 1. Preferably, one end of the shaft 2 is connected to a stepper motor 3 and the other end of the shaft is supported by a bearing block 4 or the like.

According to one preferred embodiment, the supporting platform 1 can be at least partially disassembled for maintenance and/or cleaning purposes. For instance, as shown in FIG. 4, a screw 5 could be provided for connecting the platform 1 to the shaft 2. Instead of the screw 5, a magnetic arrangement could be provided. The magnetic arrangement provides a quick and easy mechanism for attaching/detaching the platform 1.

Preferably, the maximum tilting angle of the supporting platform 1 is of ±15 degrees. Preferably, the tilting angle is ±12 degrees. Preferably, the rotation speed of the supporting platform 1 can be of 1 rpm.

Preferably, the stepping motor 3 and the bearing block 4 are mounted on a plate 6, partially shown in the Figures.

According to a preferred embodiment, the platform 1 is at least partially enclosed in a drain container 7 for collecting any liquid which could accidentally come out from the jug during use. While not shown in the Figures, the top opening of the drain container 7 could be closed by a grid or a lid with (linear or curved) slots.

Figure 8:
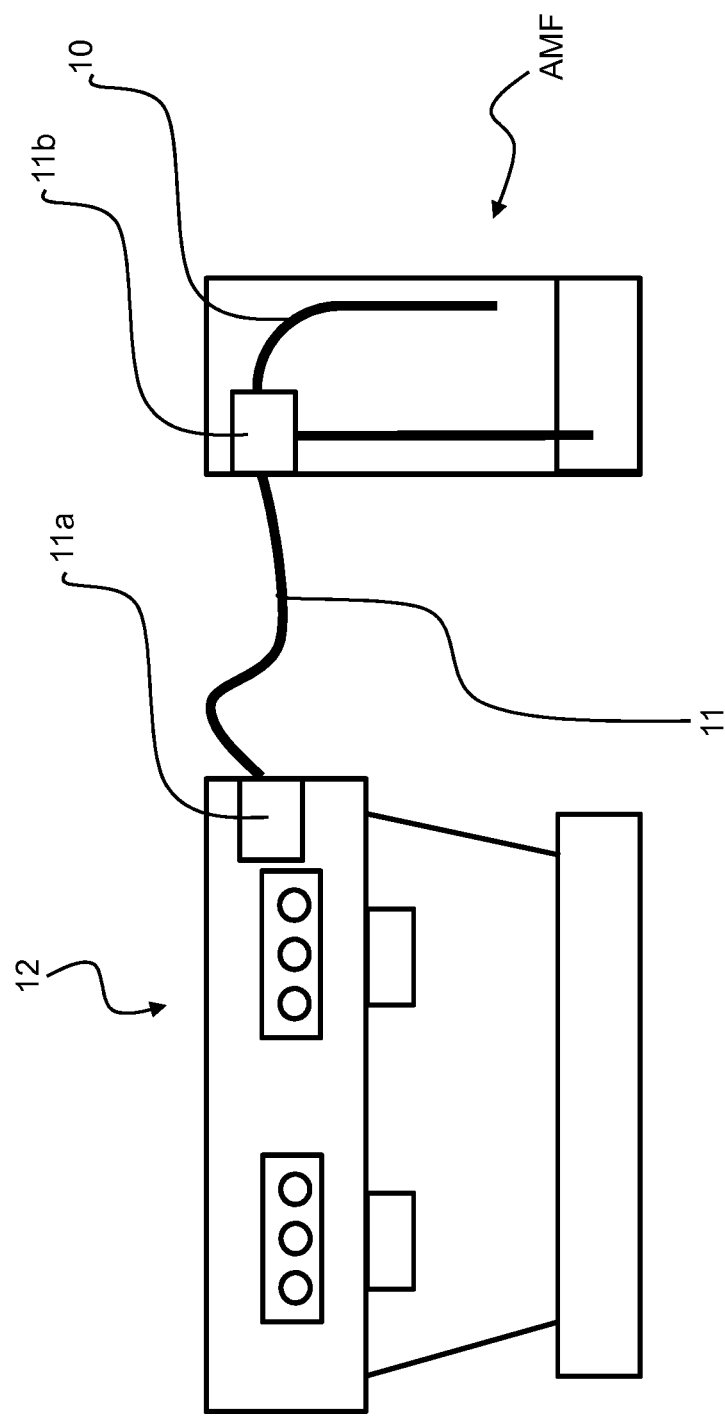
FIG. 8 is a schematic view showing the connection between the frothing apparatus of the present invention and a coffee machine.

The apparatus according to the present invention further comprises a steam wand 10 made of stainless steel or other metal material. According to one embodiment, the steam wand is of "performance touch" type with two concentric tubes and the steam flowing from the inner tube. An insulating material could be provided in the space between the two tubes. In this way, the outer surface of the outer tube remains at a lower temperature and it can be grasped by the barista without running the risk to become injured. Preferably, steam wand 10 is connected to a steam generator or a steam boiler (not shown) of a coffee machine 12 by a tubing 11 (FIG. 8). Possibly, the tubing 11 is of flexible type as shown in FIG. 8. According to embodiments, the tubing 11 is at least partially made of a synthetic fluoropolymer of tetrafluoroethylene, polytetrafluoroethylene (PTFE).

A linear actuator 15 is mounted perpendicular to the plate 6. The linear actuator 15 could be hollow to accommodate cables and/or tubing, for instance steam tubing 11.

The linear actuator can be of any known type. For example, the PMI KM Mono Stage Actuator is deemed to be appropriate for the apparatus of the present invention. It is manufactured with a linear guide and ballscrew unit. Its design allows to save space, by combining the carriage of the linear guideway and nut of the ballscrew to a complete Carriage-Nut.

Carriage 151 is configured for a vertical movement substantially perpendicular to the plate 6. See double arrow Z. Steam wand 10 is connected to the sliding carriage 151. The linear actuator 15 can be electrical or hydraulic or pneumatic.

Thanks to the above arrangements, the steam wand 10 can be moved towards or away from the bottom of the jug 50 and the jug can be properly tilted around axis X while the steam is emitted from the wand. Both the translation and the tilting movements reproduce manual movements generally carried out by a barista while he/she is frothing milk in the jug 50. Tilting movement increases liquid circulation inside the liquid container 50 due to gravitation forces.

While the preferred movement is of the steam wand with respect to the jug, according to the present invention such movement can be replaced by a translation of the jug toward the steam wand.

The apparatus of the invention imitates the motion of highly skilled coffee machine operators hand. Consequently, the apparatus is designed to accommodate two fundamental automatic dynamic motions: vertical motion of the steam wand on Z axis and pivotal motion of milk container on the X axis. Preferably, no motion is required on the Y axis.

The combination between the vertical motion of the steam wand and the pivotal (tilting) motion of the milk container provide the dynamic range required to:
1. froth/texture the highest quality of micro foam milk,
2. froth/texture milk quantity of 120-600 ml,
3. froth/texture milk to temperature range of 40-80° C.,
4. froth/texture the milk with volume increase of 0-100%,
5. froth/texture range of milk types, and
6. froth/texture milk using different container sizes.

Preferably, the apparatus AMF of the present invention comprises a user interface 20 for displaying and/or setting and/or recalling operation parameters. The user interface 20 could comprise a display and any known means for selecting and/or entering parameters. Such means could include a keyword, a (LCD) touch screen, selection keys, selection knob(s), arrangements based on speech recognition or the like. By such means the user could select a specific setting, possibly stored into a memory. According to an embodiment, the end user is allowed to save ideal milk pre-sets on to dedicated buttons. The display could be in any part of the apparatus or it can be remote from it. For instance, it can be arranged on a separated coffee machine. The connection could be wired or wireless.

In the embodiment showed in the figures, the user interface comprises a display 21, a selection knob 22 and three preset buttons 23, 24 and 25. The information which could be displayed and/or set will be disclosed in the following.

According to preferred embodiments, one or more temperature sensors for detecting, directly or indirectly, the temperature of the milk during the frothing could be provided.

According to one embodiment, a first temperature sensor 30 is configured for detecting and/or monitoring an outer temperature of the liquid container. In other embodiments, the temperature sensor can be embedded to the jug. The first temperature sensor 30 could be an infrared sensor directed substantially horizontally towards the jug. Preferably, the first temperature sensor 30 is arranged in such a way that it senses the lower part of the jug where milk is certainly present.

In addition to, or instead of, the above first temperature sensor 30 a second sensor 31 could be provided. Second sensor 31 is configured for sensing the temperature of the milk in the jug. The second temperature sensor 31 could be an infrared sensor directed substantially vertically towards the milk surface in the jug. Preferably, the second temperature sensor 31 is protected and enclosed in a top housing projecting on the jug.

Figure 2:
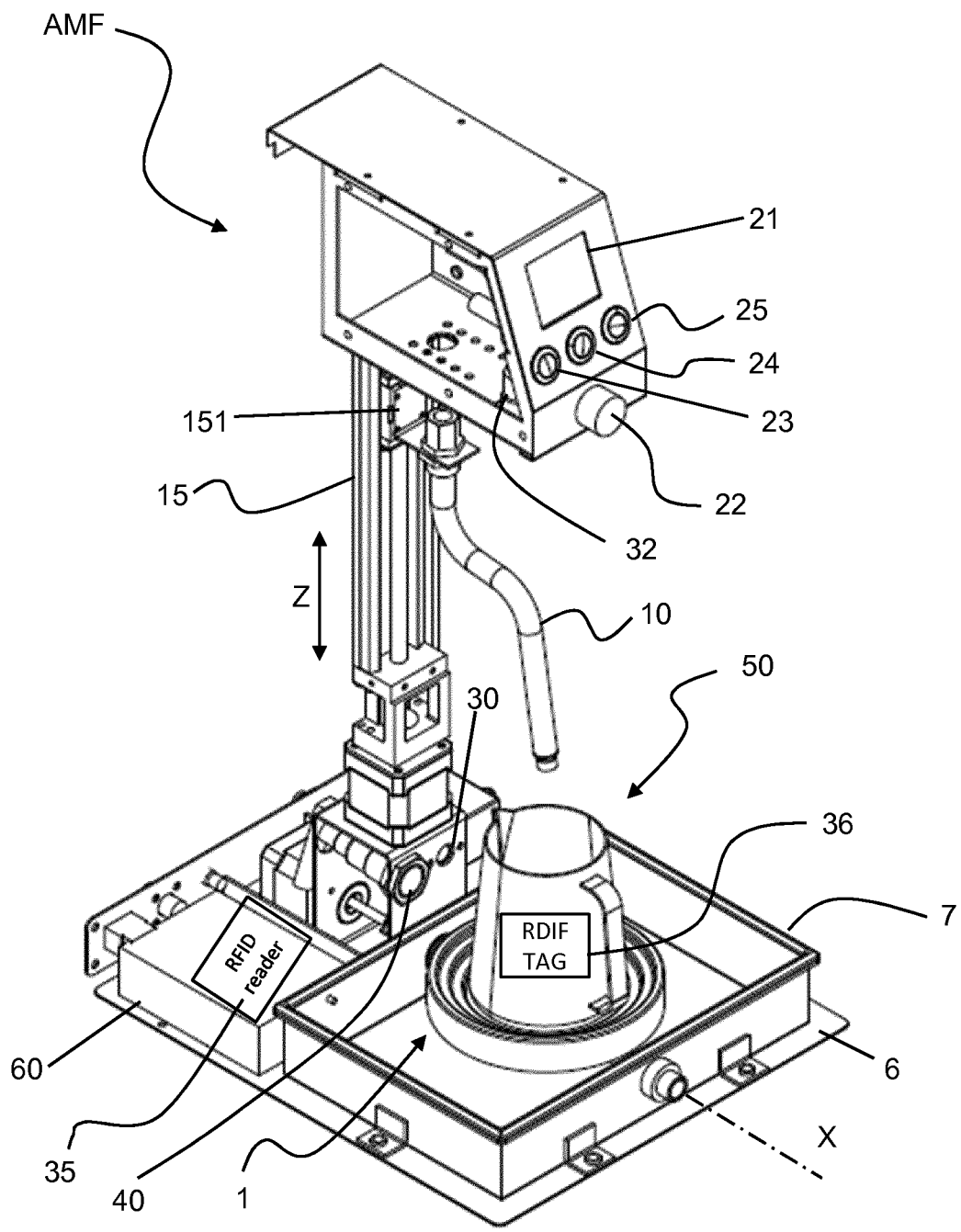
FIG. 2 is another isometric view of the frothing apparatus shown in FIG. 1.
Figure 3:
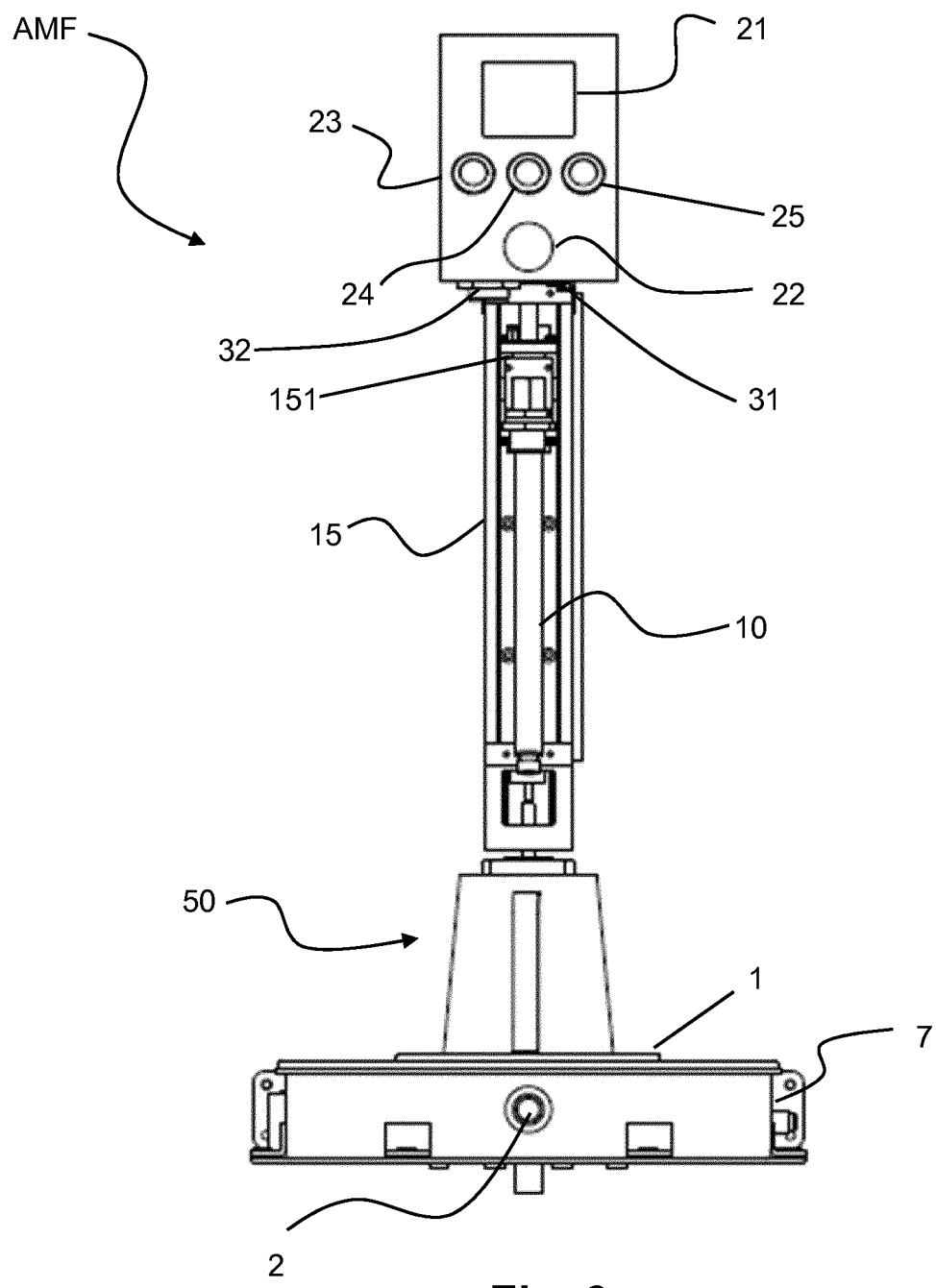
FIG. 3 is a front view of the frothing apparatus shown in FIG. 1.

According to one embodiment, the apparatus AMF further comprises a proximity sensor (possibly ultrasonic) 32 for measuring milk level in the jug. As shown in FIG. 2, milk level proximity sensor could be arranged in the above top housing. This position maintains the components protected.

As said above, according to a preferred embodiment, the apparatus AMF is configured for accommodating jugs 50 having different sizes. Preferably, the size of the jug which is going to be used is detected by a RFID 35 reader which reads a radio-frequency identification (RFID) tag 36 on the jug or by ultrasonic sensor that determinates the size of the jug on the supporting platform 1. As it is known, RFID uses electromagnetic fields to automatically identify and track tags attached to objects and containing electronically stored information. Alternative embodiments (not shown) are based on bar code readers, QR code readers or any other code reader (with the bar/QR code being attached to the outer wall of the jug).

In addition (or in alternative) to the RFID reader 35, according to the present invention there is provided a proximity sensor (possibly ultrasonic) 40 for detecting the jug size. Possibly, the proximity sensor 40 is arranged at the lower part of the apparatus, so that it senses lower part of the jug.

The steam for the apparatus AMF for the present invention could be generated in any known manner. In one embodiment, the steam is generated at the apparatus. In other embodiments, the steam is generated remotely therefrom. Preferably, as shown in the schematic drawing of FIG. 8, the steam is generated at a coffee machine and is transported to the apparatus by steam tubing 11. Preferably, a 2-way solenoid valve 11a or a 2-way mechanical valve is provided at the steam generation point and a 3-way solenoid valve 11b is provided at the apparatus AMF.

The provision of the 3-way solenoid valve 11b is advantageous in that it allows to have a third way through which, when the barista so desires (possibly at the beginning of each new cycle) to discharge any condensate steam formed in the steam tubing 11. Advantageously, the condensate steam can be discharged in the drain container.

The provision of the 3-way solenoid valve 11b is advantageous in that it allows to have a third way through which, when the barista so desires (possibly at the end of each new cycle) to remove any overpressure possibly present in the steam wand.

Preferably, the apparatus according to the present invention comprises a microprocessor 60. The microprocessor 60 can be connected to a memory with pre-set programs configured to control one or more of the vertical position of the steam wand, the duration of steam supply, the steam pressure, the angle of pivoting of the jug and the tilting speed.

Preferably, the frothing process is started by the barista and is terminated upon reaching a certain condition. For instance, the process is terminated when the required temperature of jug surface is satisfied, and desired milk volume increase is satisfied. Preferably, when the frothing process is terminated, the steam wand returns to home position (uppermost position) and the platform tilts back to horizontal position.

The steam used in the apparatus according to the invention to texture the milk and increase its temperature may be incorporated in an existing coffee machine and/or an independent pressure vessel uniquely designed for the specific apparatus.

The frothing apparatus AMF of the present invention may be a separated apparatus or it might be used in conjunction with an automatic milk dispenser to fill the milk container.

FIGS. 1 to 4 show an embodiment of the apparatus in the home position wherein the platform is horizontal and not tilting and the steam wand is not emitting steam towards the milk into the jug. The home position can be either the position before starting the frothing of the milk or when the frothing has been completed.

Figure 5:
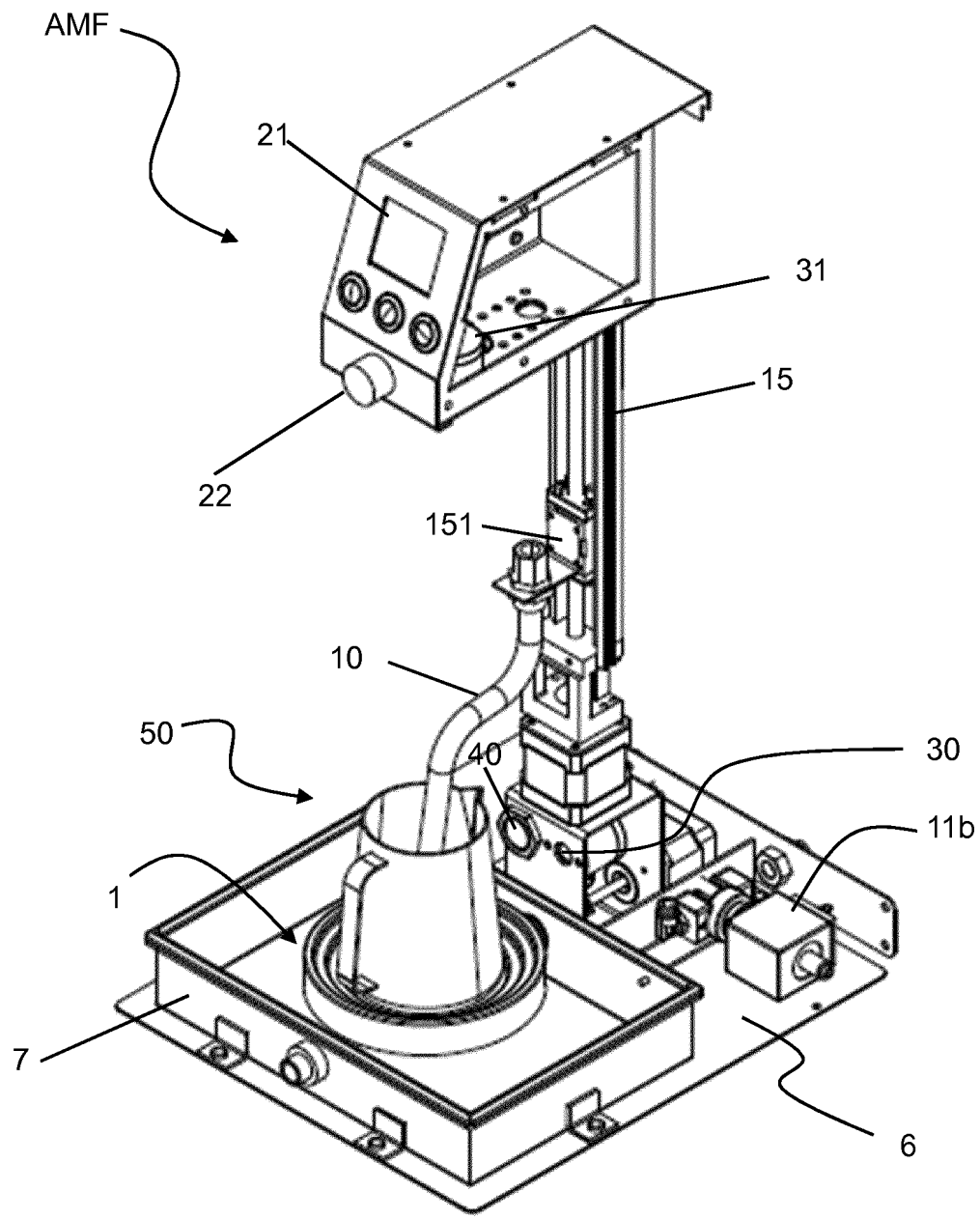
FIG. 5 is an isometric view of the frothing apparatus of FIG. 1 with the steam wand in its lowermost position and the liquid container support in horizontal position.
Figure 6:
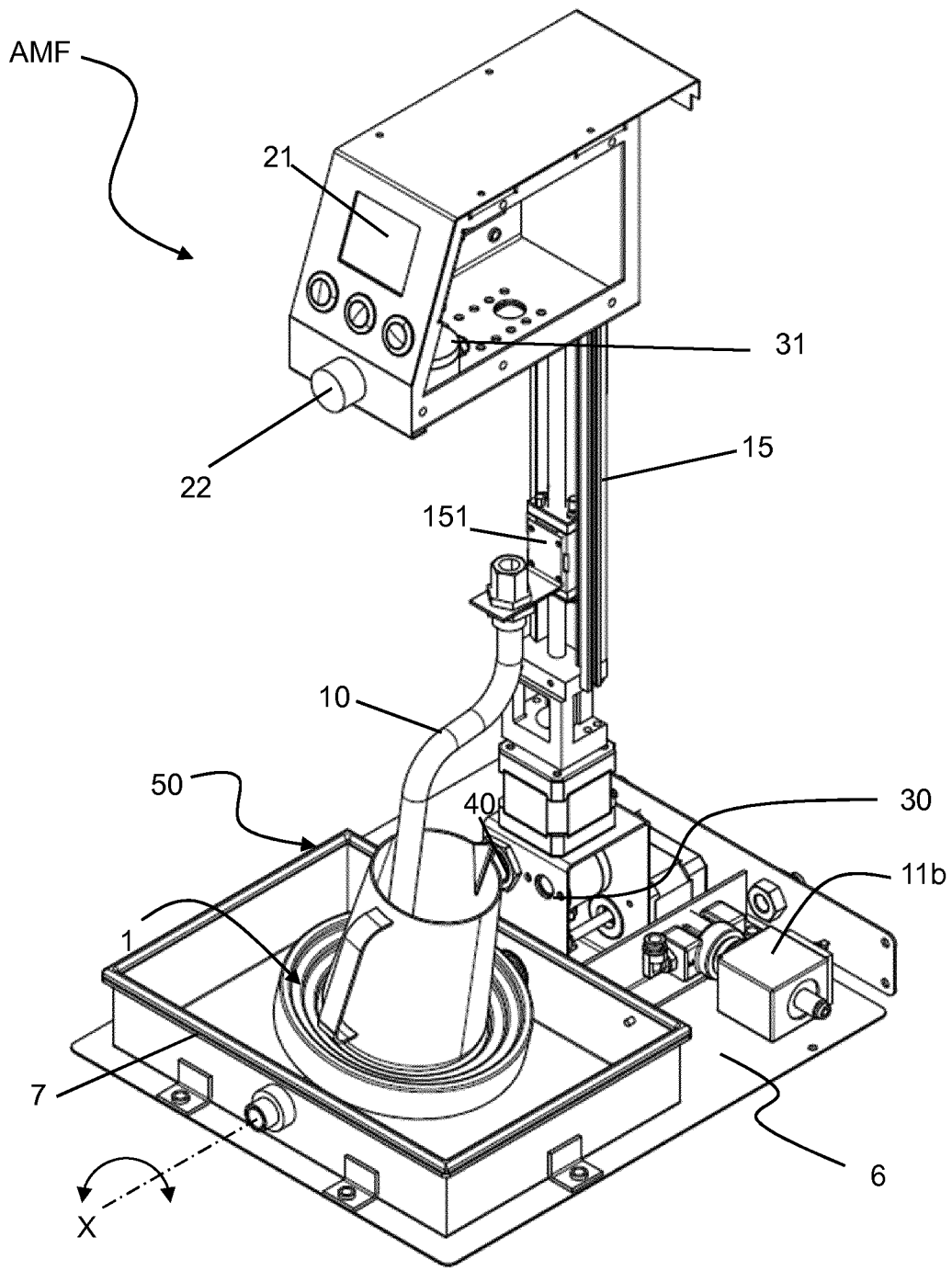
FIG. 6 is an isometric view similar to FIG. 5 with the liquid container support in tilted position.

FIG. 5 shows the steam wand into the jug but the platform horizontal. Finally, FIG. 6 shows the steam wand into the jug and the platform tilted with respect to the horizontal arrangement.

The maximum path of vertical travel for the wand could be about 300 mm.

FIG. 7 show some examples of interface of the apparatus according to the present invention. As shown, the display 21 can display one or more information among those sensed and detected by the various sensors disclosed above.

Figure 7A:
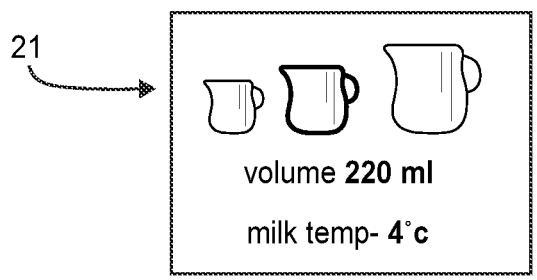
FIGS. 7a, 7b and 7c show the user interface of the frothing apparatus according to an embodiment of the present invention.

For instance (FIG. 7a), the display could indicate the size of the jug which is on the platform, among a small size jug, a medium size jug and a large size jug. In FIG. 7a, the medium size jug has been detected and the display so shows. Other information displayed could be: a volume of the milk in the jug (220 ml in the example of FIG. 7a) and the milk temperature (4° C. in the example of FIG. 7a).

Figure 7B:
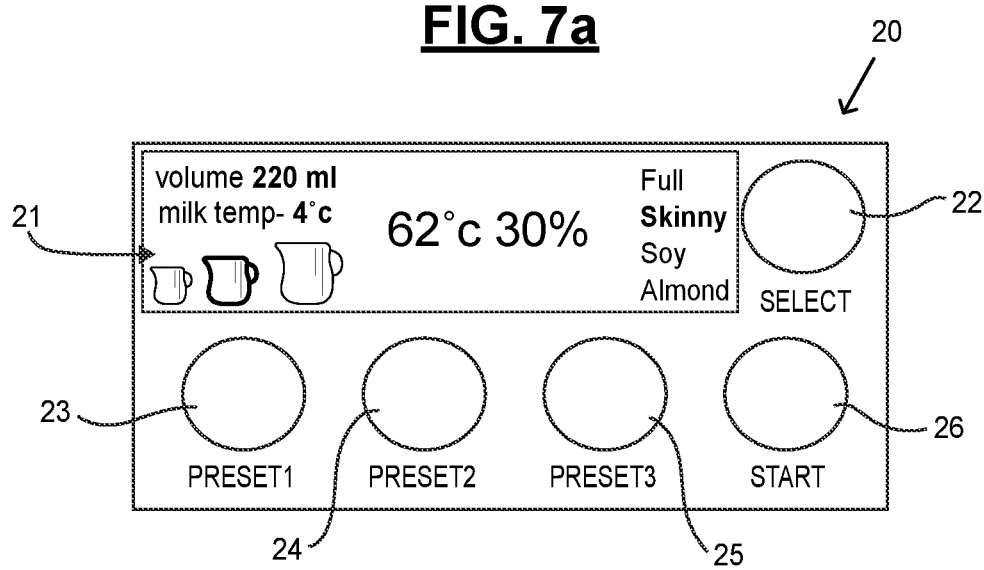

FIG. 7b shows the display 21, selection knob 22, three preset buttons 23, 24 and 25 and a start button 26. Display 21 of FIG. 7b shows the same information of display 21 of FIG. 7a. It also shows a desired temperature of the milk (62° C.) at the end of frothing and the desired percentage of frothing (30%). It also shows the type of milk (skinny) which is frothing. The selected values and type of milk could be selected from a menu (not shown), possibly through the selection knob. Pre-selections could also be recalled by any of buttons 23, 24 and 25.

Figure 7C:
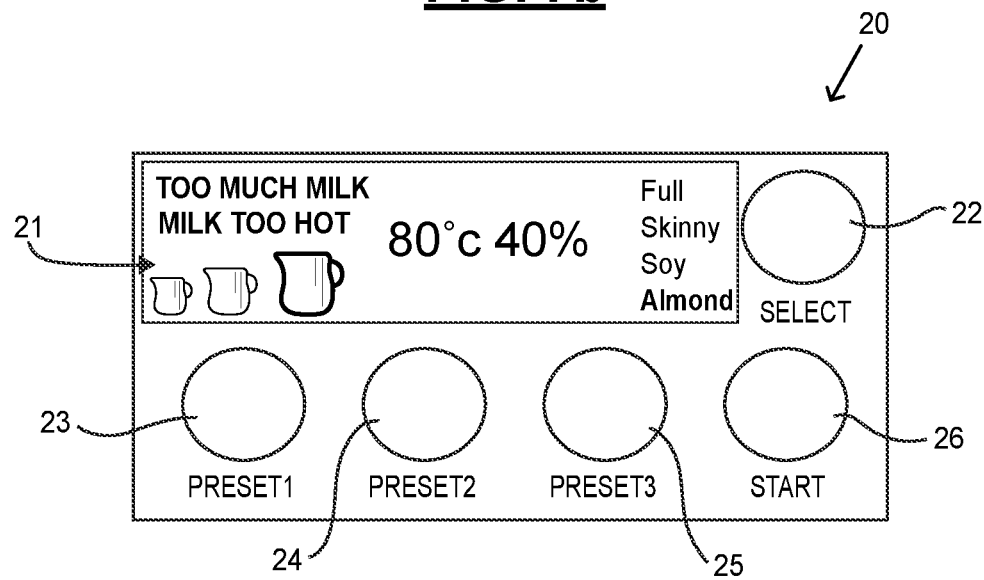

The apparatus of the invention could be designed so that it does not operate if some conditions are not fulfilled. FIG. 7c shows, as an example, an alarm condition. For example, the apparatus does not start operation if the amount of milk is insufficient. Another alarm could relate to a too high temperature of the milk.

The above mentioned (LCD) touch screen may be used in conjunction with a key pad. The controls and screen are preferably arrayed on angled panel which is easily visible to the user above or under the apparatus.

A reset button could be positioned in the front of the device in highly approachable location. Pressing this button will shut off the 2-way solenoid valve and stop the steam dispensed by the wand immediately. Also, the wand will return to home position (FIG. 1) and platform will tilt back to home position (FIG. 1).

Figure 9:
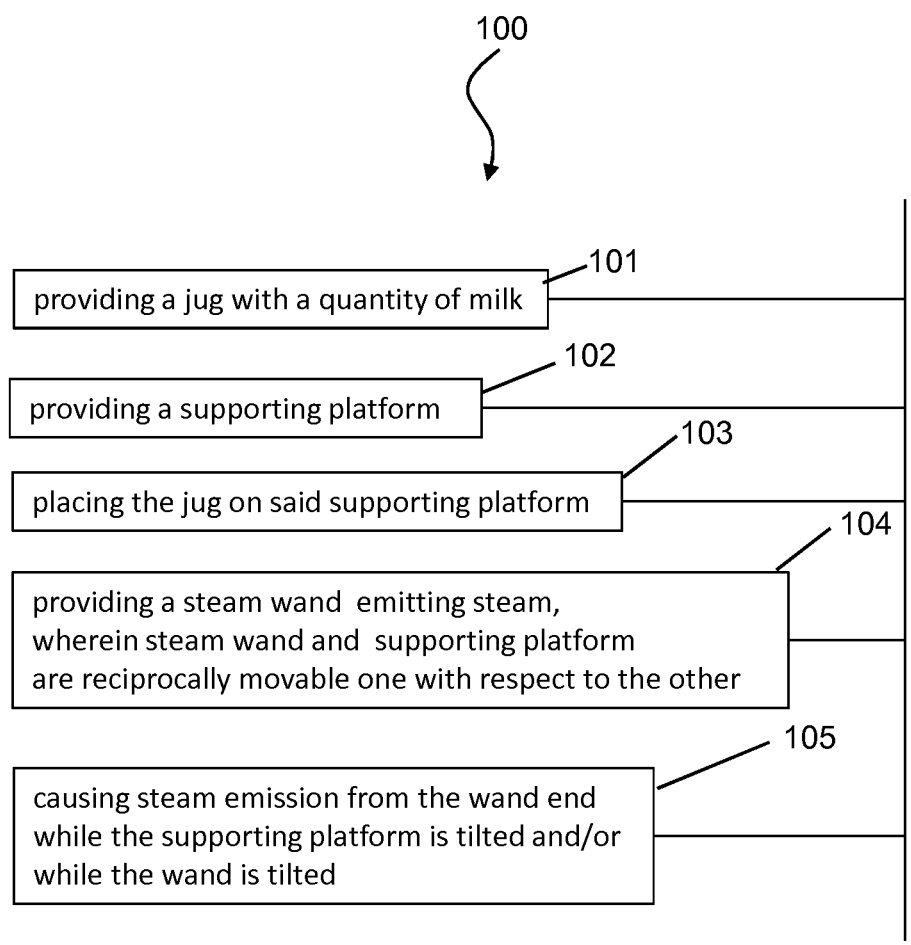
FIG. 9 is a diagrammatic representation of a method according to the present invention.

FIG. 9 is a flow chart 100 of the method of frothing a quantity of milk for preparing a beverage according to the present invention. The method comprises:

101: providing a jug 50 with a quantity of milk therein;
102: providing a supporting platform 1 and
103: placing the jug 50 on said supporting platform 1;
104: providing a steam wand 10 emitting steam, wherein said steam wand 10 and said supporting platform 1 are reciprocally movable one with respect to the other from a first position wherein an end of the wand is not within said jug 50 to a second position wherein said end of the wand 10 is within said jug 50 immersed in the quantity of milk; and
105: causing emission of steam and/or heated air from said wand 10 end while tilting at least one of said supporting platform 1 and steam wand 10.

The invention claimed is:

1. An apparatus for frothing a quantity of milk for preparing a beverage, the apparatus comprising:
a platform for supporting a jug containing the quantity of milk to be frothed,
wherein the platform is configured to centrally selectively accommodate on the platform a jug of a first diameter and a jug of a second diameter, the second diameter being greater than the first diameter;
the platform comprising a horizontal un-tilted position and wherein the platform is tiltable about a horizontal axis; and
a steam wand comprising an end configured to emit steam and/or heated air,
a drain container configured to at least partially enclose the platform;
a horizontal shaft and a motor connected to said horizontal shaft, wherein the horizontal shaft passes through a wall of the drain container;
wherein the steam wand and the platform are reciprocally movable one with respect to the other; and
wherein steam is emitted from the end of the steam wand while tilting the platform;
a processor configured to control one or both of a tilting angle and a tilting speed of the platform, wherein the processor is configured to tilt the platform and the jug in a pivotal motion whereby gravitational force forces the milk in a rotational manner to create turbulences which smooth out air bubbles in the milk introduced by the steam to result in a micro bubbles consistency.

2. The apparatus according to claim 1, wherein the steam wand and the platform are movable one with respect to the other through a translational vertical motion of the steam wand with respect to the jug and/or of the jug with respect to the steam wand.

3. The apparatus according to claim 1, wherein the horizontal shaft is also connected to the platform so that tilting of the horizontal shaft results into tilting of the platform.

4. The apparatus according to claim 1, further comprising a linear actuator with a translation carriage for translating vertically the steam wand connected to the translation carriage.

5. The apparatus according to claim 1, further comprising at least one of an infrared temperature sensor arranged for sensing a temperature of a side wall of the jug and an infrared milk temperature sensor arranged for sensing a temperature of the milk in the jug.

6. The apparatus according to claim 1, further comprising a proximity sensor for measuring milk level in the jug.

7. The apparatus according to claim 6, wherein the proximity sensor for the measuring milk level in the jug is situated above the jug.

8. The apparatus according to claim 1, further comprising a radio-frequency identification, RFID, reader configured for reading a radio-frequency identification, RFID, tag in order to identify a size of the jug.

9. The apparatus according to claim 1, further comprising a proximity sensor in order to identify a size of the jug.

10. The apparatus according to claim 1, further comprising a three-way valve connected to a source of steam.

11. The apparatus according to claim 1, further comprising a display and means for selecting and/or entering one of a plurality of parameters, wherein the means for selecting and/or entering parameters comprise one or more of a keyword, a touch screen, selection keys, selection knob(s) or arrangements based on speech recognition.

12. The apparatus of claim 1, wherein the platform is tiltable to repetitively oscillate about the horizontal axis while the steam is emitted from the end of the steam wand.

13. The apparatus according to claim 1, wherein a maximum tilting angle of the platform is ±15 degrees.

14. The apparatus according to claim 1, wherein the platform comprises magnets configured to selectively accommodate and center on the platform the jug of the first diameter and the jug of the second diameter.

15. An apparatus for frothing a quantity of milk for preparing a beverage, the apparatus comprising:

a platform for supporting a jug containing the quantity of milk to be frothed, wherein the platform comprises a horizontal position and a position inclined about a horizontal axis, wherein the platform is configured to centrally selectively accommodate on the platform a jug of a first diameter and a jug of a second diameter, the second diameter being greater than the first diameter;

a steam wand comprising an end configured to emit steam and/or heated air;

a drain container configured to at least partially enclose the platform;

a horizontal shaft and a motor connected to said horizontal shaft, wherein the horizontal shaft passes through a wall of the drain container;

wherein the steam wand and the platform are reciprocally movable one with respect to the other; and wherein steam is emitted from the end of the steam wand while the platform is in the inclined position.

* * * * *